United States Patent
Ji et al.

(10) Patent No.: US 10,176,553 B2
(45) Date of Patent: Jan. 8, 2019

(54) IMAGE PROCESSING SYSTEM WITH THREE-DIMENSIONAL VIEWING AND METHOD OF OPERATION THEREOF

(71) Applicant: Sony Corporation, Tokyo (JP)

(72) Inventors: Wei Ji, San Jose, CA (US); Mohammad Gharavi-Alkhansari, San Jose, CA (US)

(73) Assignee: Sony Corporation, Tokyo (JP)

( * ) Notice: Subject to any disclaimer, the term of this patent is extended or adjusted under 35 U.S.C. 154(b) by 290 days.

(21) Appl. No.: 14/751,788

(22) Filed: Jun. 26, 2015

(65) Prior Publication Data

US 2016/0381350 A1 Dec. 29, 2016

(51) Int. Cl.
G06T 3/20 (2006.01)
G06T 3/40 (2006.01)
H04N 13/366 (2018.01)

(52) U.S. Cl.
CPC ............... G06T 3/40 (2013.01); G06T 3/20 (2013.01); H04N 13/366 (2018.05); H04N 2213/006 (2013.01)

(58) Field of Classification Search
CPC . G06T 3/40; H04N 13/0468; H04N 2213/006
See application file for complete search history.

(56) References Cited

U.S. PATENT DOCUMENTS

| | | | |
|---|---|---|---|
| 4,670,744 A | 6/1987 | Buzak | |
| 6,059,727 A | 5/2000 | Fowlkes et al. | |
| 7,016,116 B2 | 3/2006 | Dolgoff | |
| 7,843,449 B2 | 11/2010 | Krah | |
| 8,754,847 B2 | 6/2014 | Huang et al. | |
| 2010/0253766 A1* | 10/2010 | Mann | G06F 3/011 348/51 |
| 2012/0002082 A1* | 1/2012 | Johnson | G06T 5/50 348/234 |
| 2012/0206453 A1* | 8/2012 | Bruls | H04N 19/597 345/419 |
| 2013/0063572 A1* | 3/2013 | Ramachandra | H04N 13/122 348/47 |
| 2013/0127838 A1 | 5/2013 | Derrig | |
| 2014/0104477 A1* | 4/2014 | Choi | G11B 27/28 348/333.05 |
| 2015/0215532 A1* | 7/2015 | Jafarzadeh | H04N 5/23238 348/36 |

FOREIGN PATENT DOCUMENTS

EP 1089573 B1 * 5/2008 ......... H04N 13/0011
EP 1089573 B1 * 5/2008 ......... H04N 13/0011

\* cited by examiner

*Primary Examiner* — Mohammed S Rahaman
*Assistant Examiner* — Richard A Hansell, Jr.
(74) *Attorney, Agent, or Firm* — Haverstock & Owens LLP

(57) ABSTRACT

A system and method of operation of an image processing system includes: a get original image module for receiving an original image; a viewer detection module, coupled to the get original image module, for receiving a first position and a second position of a viewer; a crop image module, coupled to the position detector, for calculating a cropping offset for the original image based on the first position and the second position, and for calculating a cropped image by cropping the original image by the cropping offset; and a display image module, coupled to the crop image module, for displaying the cropped image on a display unit.

16 Claims, 10 Drawing Sheets

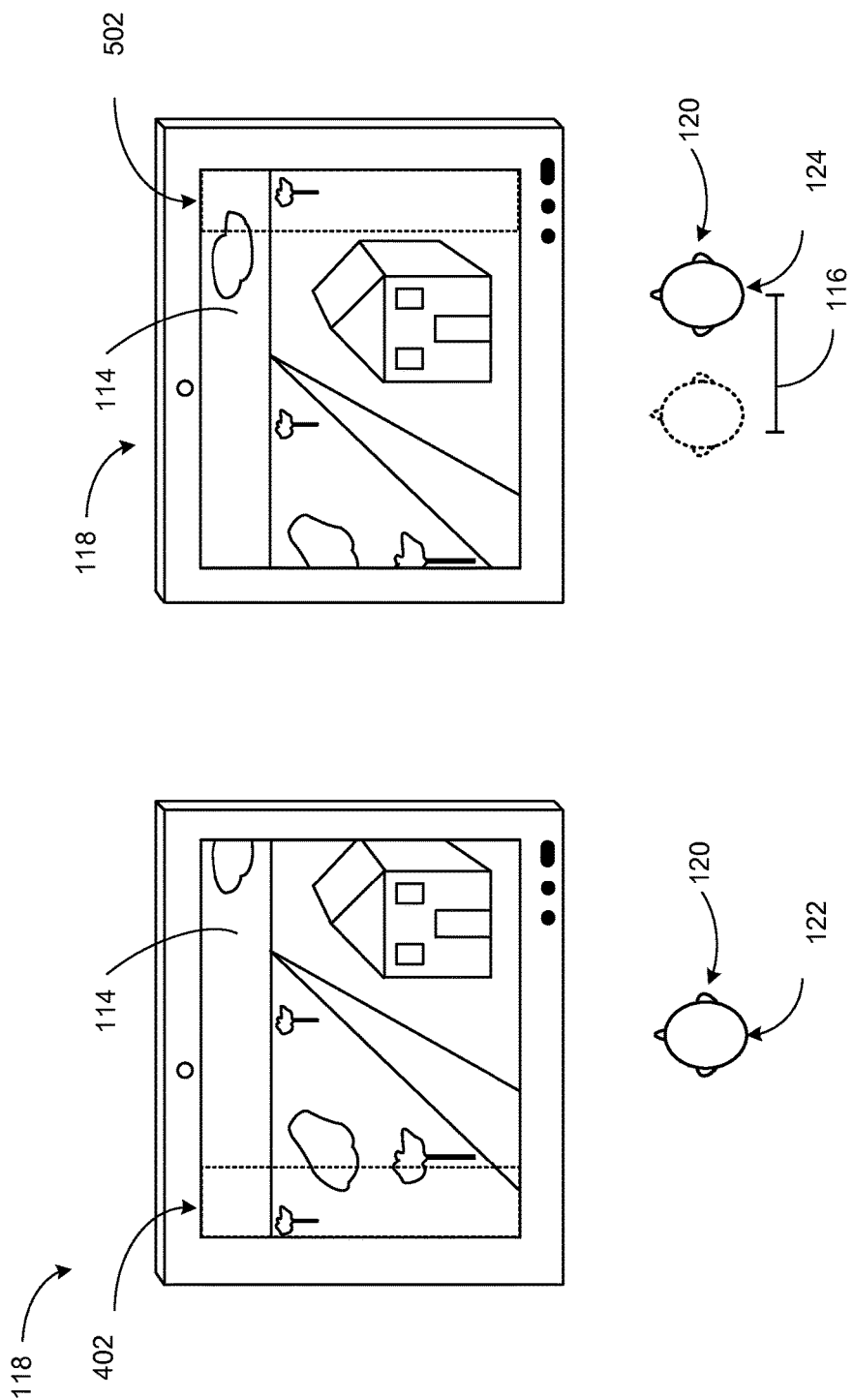

IMAGE PROCESSING SYSTEM WITH THREE-DIMENSIONAL VIEWING AND METHOD OF OPERATION THEREOF

TECHNICAL FIELD

The present invention relates generally to an image processing system, and more particularly to an image processing system with three-dimensional viewing.

BACKGROUND ART

Modern consumer and industrial electronics, especially devices with a graphical display capability, such as televisions, projectors, smart phones, and combination devices, are providing increasing levels of functionality to support modern life including three-dimensional (3D) display services. Research and development in the existing technologies can take a myriad of different directions.

As users become more empowered with the growth of three-dimensional display devices, new and old paradigms begin to take advantage of this new device space. There are many technological solutions to take advantage of this new display device opportunity. One existing approach is to view three-dimensional images with special glasses or viewing mechanisms on consumer, industrial, and mobile electronic devices such as video projectors, televisions, monitors, smart phones, gaming systems, cameras, or a personal digital assistant (PDA). Three dimensional glasses can include shutter or polarized based hardware. Alternatively, parallax barrier screens or individual eye displays can be used to display three-dimensional images.

Three-dimensional image processing systems have been incorporated in cameras, projectors, televisions, notebook computers, and other portable products. Today, these systems aid users by displaying relevant information, such as diagrams, maps, images, or videos. The display of three-dimensional images provides invaluable relevant information. Displaying three dimensional images and video can improve the viewing experience.

However, displaying information in three-dimensional form has become a paramount concern for the consumer. Displaying a three-dimensional image that does not correlates with the real world decreases the benefit of using the tool.

Thus, a need still remains for better image processing systems to display information with three-dimensional features. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of an image processing system including receiving an original image; receiving a first position from a position detector; receiving a second position from the position detector; calculating a cropping offset for the original image based on the first position and the second position; calculating a cropped image by cropping the original image by the cropping offset; and displaying the cropped image on a display unit.

The present invention provides an image processing system including: a get original image module for receiving an original image; a viewer detection module, coupled to the get original image module, for receiving a first position and a second position of a viewer; a crop image module, coupled to the position detector, for calculating a cropping offset for the original image based on the first position and the second position, and for calculating a cropped image by cropping the original image by the cropping offset; and a display image module, coupled to the crop image module, for displaying the cropped image on a display unit.

Certain embodiments of the invention have other steps or elements in addition to or in place of those mentioned above. The steps or element will become apparent to those skilled in the art from a reading of the following detailed description when taken with reference to the accompanying drawings.

BRIEF DESCRIPTION OF THE DRAWINGS

FIG. 4 is a first example of the display unit.
FIG. 5 is a second example of the display unit.

BEST MODE FOR CARRYING OUT THE INVENTION

Figure 1:
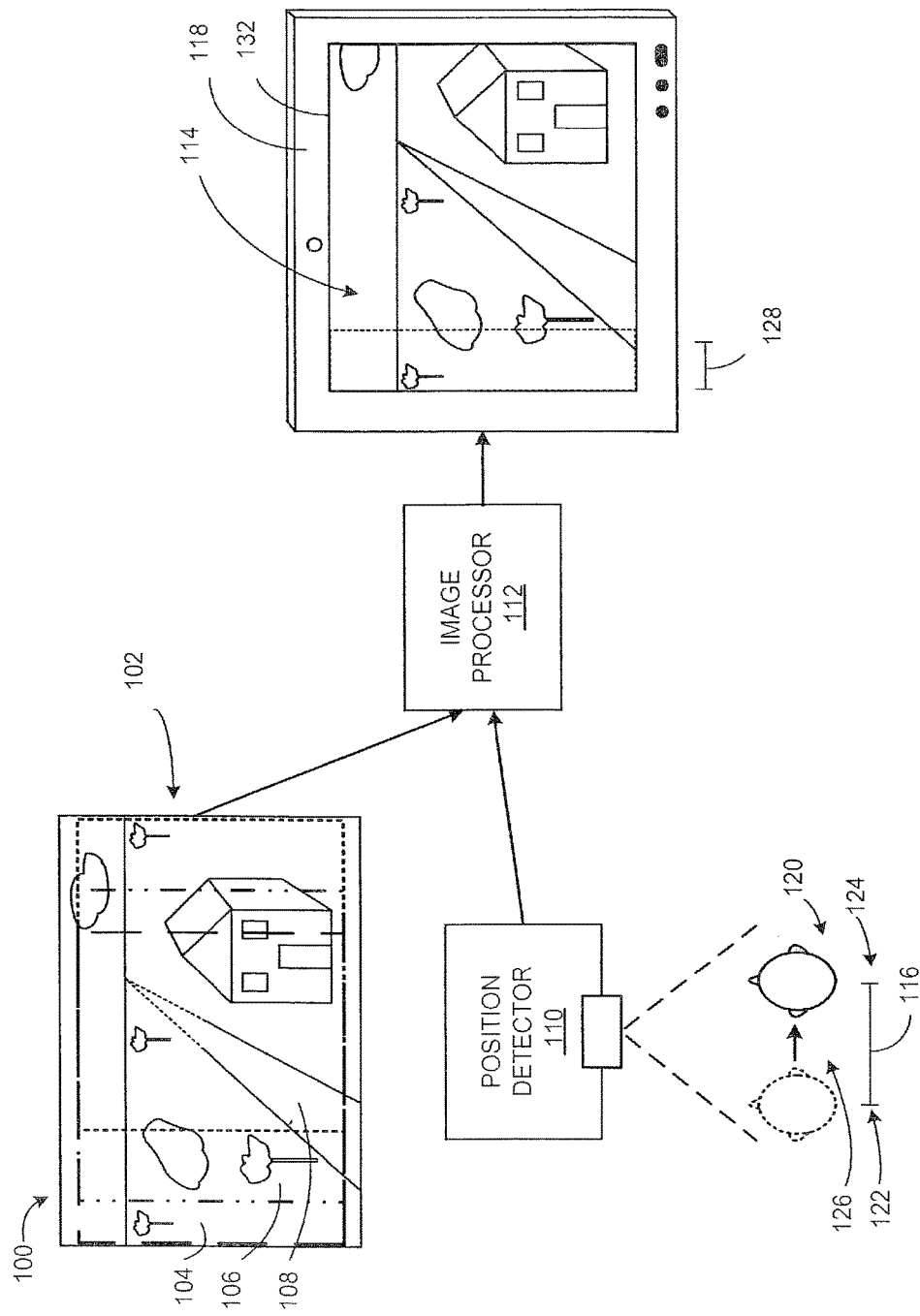
FIG. 1 is an image processing system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same elements. The embodiments have been numbered first embodiment, second embodiment, etc. as a matter of descriptive convenience and are not intended to have any other significance or provide limitations for the present invention.

The term "image" is defined as a pictorial representation of a scene having one or more object. An image can include a two-dimensional image, three-dimensional image, a video frame, a calculated graphical representation, an image from a camera, or a combination thereof. The image can have different formats and types. For example, the image can be a machine readable digital file, a physical photograph, a digital photograph, a motion picture frame, a video frame, an x-ray image, a scanned image, or a combination thereof. The image can be formed by pixels arranged in a rectangular array. The image can include an x-axis along the direction of the rows and a y-axis along the direction of the columns.

The horizontal direction is the direction parallel to the x-axis of an image. The vertical direction is the direction parallel to the y-axis of an image. The diagonal direction is the direction non-parallel to the x-axis and non-parallel to the y-axis.

The term "module" referred to herein can include software, hardware, or a combination thereof. For example, the software can be machine code, firmware, embedded code, and application software. Also for example, the hardware can be circuitry, processor, calculator, integrated circuit, integrated circuit cores, or a combination thereof.

Referring now to FIG. 1, therein is shown an image processing system 100 in an embodiment of the present invention. The image processing system 100 can receive an original image 102, detect a first position 122 and a second position 124 of a viewer 120, and calculate a cropped image 114 for display on a display screen 132 of a display unit 118.

The cropped image 114 is a subset of the original image 102. The cropped image 114 can be smaller horizontally than the original image 102. The cropped image 114 can be smaller vertically than the original image 102. For example, the cropped image 114 can be a left image 104, a right image 108, or a center image 106. The cropped image 114 can be cropped by a value indicated by a cropping offset 128. The cropping offset 128 is the amount of the original image 102 that is cropped and removed to form the cropped image 114.

The image processing system 100 can include a position detector 110 to detect the location of the viewer 120 as the viewer 120 moves. For example, the position detector 110 can be a camera, an optical sensor, an infrared sensor, an ultrasonic detector, a radio frequency identification detector, a global positioning system sensor, or a combination thereof. The position detector 110 can detect the location of the viewer 120 to determine the first position 122 and the second position 124.

In an illustrative example, the position detector 110 can include a camera for detecting the viewer 120 against a background scene. The position detector 110 can include dedicated hardware and software for extracting the image of the viewer 120 from the background scene shown in a detector image. The position detector 110 can detect motion of the viewer 120 by comparing multiple detector images taken at different time intervals and determining the difference between the detector images.

In another illustrative example, the position detector 110 can have a resolution of 1 centimeter at a distance of 1 meter from the position detector 110 to the viewer 120. In an alternative example, the position detector 110 can have a minimum resolution of 0.3 degrees. This is the equivalent of one centimeter horizontal movement at a user distance of two meters.

In another example, the position detector 110 can determine a current position 126 of the viewer 120 at a frequency of more than 120 hertz. The position detector 110 can determine the current position 126 of the viewer 120 between the frame intervals in a video stream.

Displaying the cropped image 114 to provide an immersive three-dimensional experience based a viewer movement 116 reduces complexity by eliminating additional hardware, such as glasses, parallax screens, or single-eye displays. Reducing the amount of hardware required can reduce overall manufacturing costs and increase the availability of the three-dimensional immersive environment.

It has been discovered that displaying the cropped image 114 provides a lightweight immersive three dimensional effect for viewing the original image 102 on the display unit 118. The cropped image 114 is calculated based on the viewer movement 116.

It has been discovered that displaying the cropped image 114 to provide the immersive three dimensional effect allows the viewer 120 to move freely while viewing the display. By detecting the viewer position and the viewer movement 116 and modifying the cropped image 114 accordingly, an image processor 112 and the display unit 118 can present the appropriate image on the display unit 118 as the viewer 120 moves.

Figure 2:
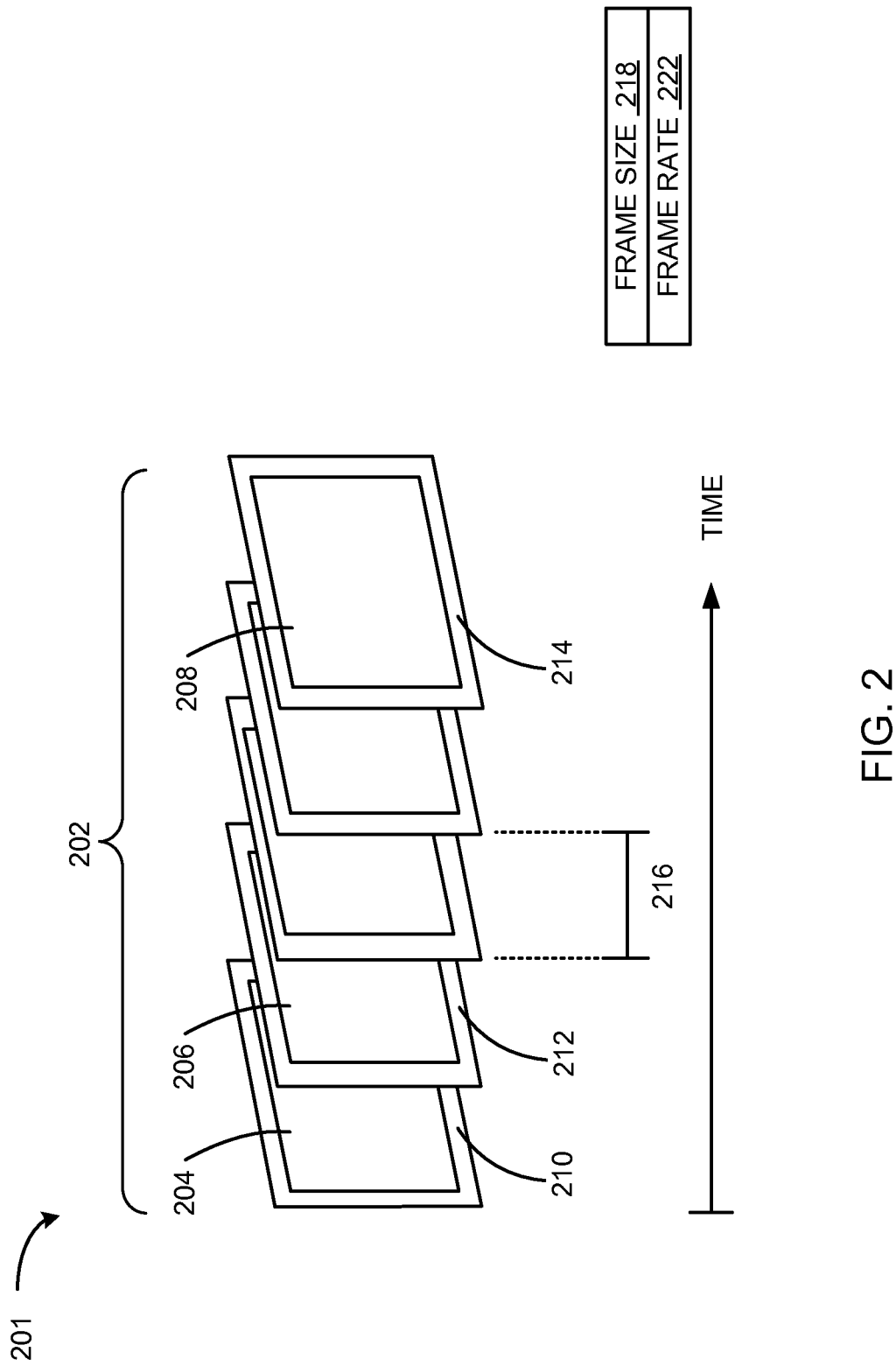
FIG. 2 is an example of a video stream.

Referring now to FIG. 2, therein is shown an example of a video stream 201. The video stream 201 is a series of video frames 202. The video stream 201 can be played by displaying each of the video frames 202 in sequential order separated by a frame time 216. The original image 102 of FIG. 1 can be one of the video frame 202 in the video stream 201.

The video stream 201 can include a first frame 204, a second frame 206, and a nth frame 208. The first frame 204 can include a first image 210. The second frame 206 can include a second image 212. The nth frame can include a nth image 214.

The image processing system 100 can calculate the cropped image 114 of FIG. 1 for the second frame 206 during the frame time 216 and display the cropped image 114 as the second image 206. The cropped image 114 can be calculated based on the viewer movement 116 that occurs during the frame time 216 between the first frame 204 and the second frame 206. The image processing system 100 can detect the first position 122 of FIG. 1 of the viewer 120 of FIG. 1 and the second position 124 of FIG. 1 of the viewer 120 and calculate the cropped image based on the movement of the viewer.

The video stream 201 can be a standard definition video, a high definition video, an ultra-high definition video, 4K definition, 8K definition, IMAX, or a combination thereof. A frame size 218 of each of the video frames 202 can be a variety of sizes. For example, the frame size 218 can be 1280×720, 1920×1080, 2560×1440, 20148×1536, 3840×2160, 4520×2540, 4096×3072, 7680×4320, or a combination thereof.

The video stream 201 can have a variety of frame rates. For example, a frame rate 222 can be 24 frames a second, 30 frames a second, 60 frames a second, 120 frames a second, or another frame rate based on a video standard. Each of the video frames 202 can be separated by the frame time 216. The frame time 216 is the reciprocal of the frame rate 222.

The image processing system 100 can detect the viewer movement 116 between the first frame 204 and the second frame 206. The cropped image 114 is calculated based on the viewer movement 116 and displayed as the second image 212 of the second frame 206. Each of the frames in the video stream 201 can include the cropped image 114 that is calculated based on the viewer movement 116 between each adjacent frame in the video stream 201. This can produce the three-dimensional effect while the viewer watches the video stream 201 while moving.

It has been discovered that displaying the cropped image 114 of FIG. 1 of the original image 102 based on the change in the current position 126 of FIG. 1 of the viewer 120 of FIG. 1 simulates the immersive three dimensional view with a reduced computational requirement. As the frame size 218 becomes larger and the frame time 216 becomes shorter, computation efficiency is required to continuously update the display between frames by calculating the cropped image 114 of FIG. 1.

Figure 3B:
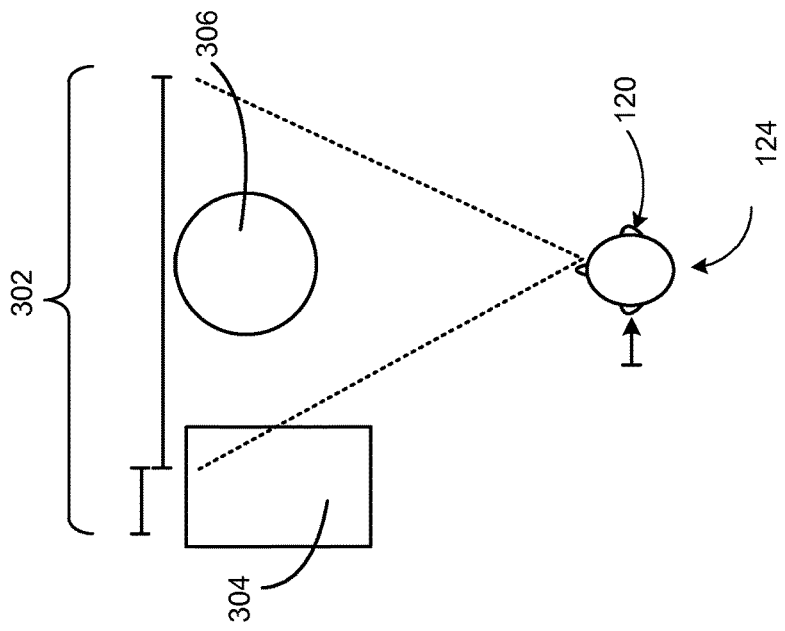
FIG. 3B is a second example of a scene.
Figure 3A:
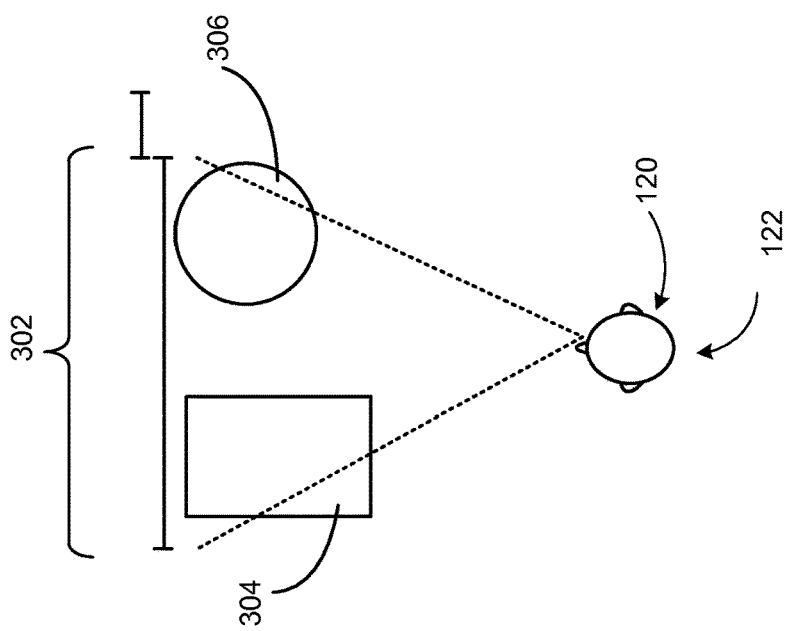
FIG. 3A is a first example of a scene.

Referring now to FIG. 3A, therein is shown a first example of a scene 302. The scene 302 shows the view of a first object 304 and a second object 306 from the perspective of the viewer 120 before a change in the position of the viewer 120. For example, when the viewer 120 is in a first position 122, the scene 302 can include a portion of the first object 304 and a portion of the second object 306.

Referring now to FIG. 3B, therein is shown a second example of a scene 302. The scene 302 shows the view of a first object 304 and a second object 306 from the perspective of the viewer 120 after a change in the position of the viewer 120. When the viewer 120 moves horizontally relative to objects in the scene, the scene 302 of the viewer 120 changes.

For example, when the viewer 120 moves to the right, then only a smaller portion of the first object 304 and the entirety of the second object 306 are in the scene 302. As the viewer 120 moves to the right to the second position 124, less of the left hand side of the first object 304 can in the scene 302 and more of the second object 306 can be in the scene 302. The three dimensional properties of the scene 302 are represented by changing what portions of the objects are visible in different positions of the viewer 120.

Referring now to FIG. 4, therein is shown a first example of the display unit 118. The display unit 118 can show the cropped image 114 showing a left margin view 402. The left margin view 402 is the portion of the original image 102 of FIG. 1 visible in the scene 302 of FIG. 3. The left margin view 402 can simulate the equivalent view of the three-dimensional scene as seen by the viewer 120 of FIG. 1 in the first position 122. The viewer 120 can see the cropped image 114 having the left margin view 402 and the center image 108 of FIG. 1.

Referring now to FIG. 5, therein is shown a second example of the display unit 118. The display unit 118 can show the cropped image 114 showing a right margin view 502. The right margin view 502 is the portion of the original image 102 of FIG. 1 visible in the scene 302 of FIG. 3. The right margin view 502 can simulate the equivalent view of the three-dimensional scene as seen by the viewer 120 in the second position 124. As the viewer 120 moves from the first position 122 to the second position 124 by a distance indicated by the viewer movement 116, the cropped image 114 can be recalculated to show the center image 108 of FIG. 1 and the right margin view 502.

Figure 6:
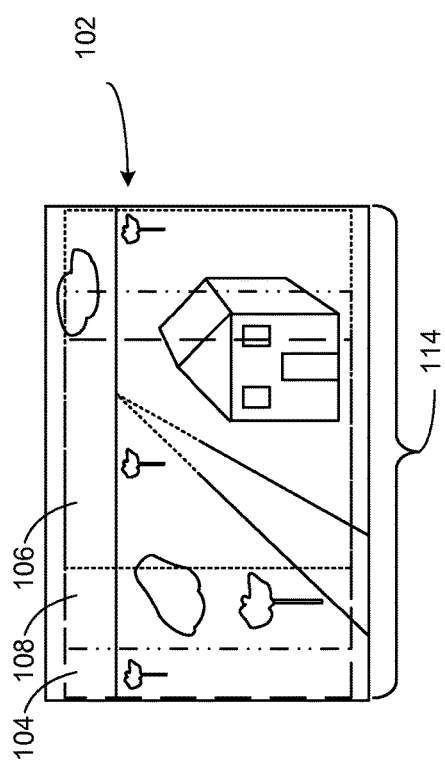
FIG. 6 is an example of the original image.

Referring now to FIG. 6, therein is shown an example of the original image 102. The original image 102 is the base image used to calculate the cropped image 114 for display on the display unit 118 of FIG. 1.

The original image 102 can be a variety of image types. For example, the original image 102 can be a digital image, an analog image, a single frame in a video or motion picture, a static image, or a combination thereof.

The original image 102 can be used to form the left image 104, the center image 108, or the right image 106. The left image 104 is the portion of the original image 102 visible from the viewer 120 of FIG. 1 in the first position 122 of FIG. 1. The right image 106 is the portion of the original image 102 visible from the second position 124 of FIG. 1. The center image 108 is the portion of the original image 102 visible from the viewer 120 in the both the first position 122 and the second position 124.

The left image 104 can include the left margin view 402 of FIG. 4 and the center image 108. The cropped image 114 can include the right margin view 502 of FIG. 5 and the center image 108.

Figure 7:
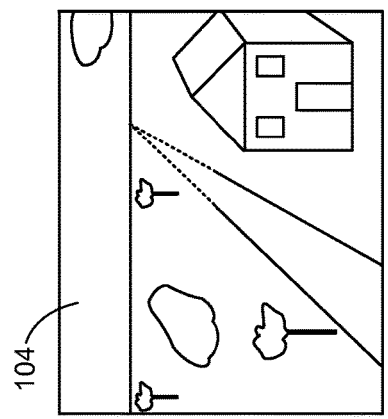
FIG. 7 is an example of the left image.

Referring now to FIG. 7, therein is shown an example of the left image 104. The left image 104 is the portion of the original image 102 of FIG. 1 visible from the first position 122 of FIG. 1.

Figure 8:
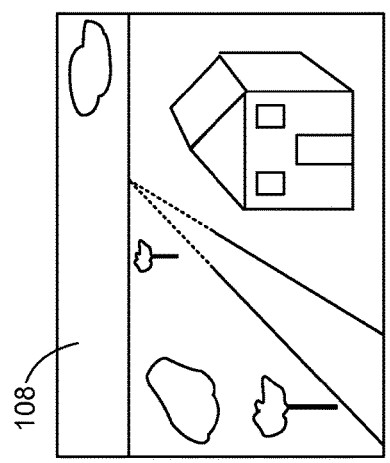
FIG. 8 is an example of the center image.

Referring now to FIG. 8, therein is shown an example of the center image 108. The center image 108 is the portion of the original image 102 of FIG. 1 visible from the both the first position 122 of FIG. 1 and the second position 124 of FIG. 1.

Figure 9:
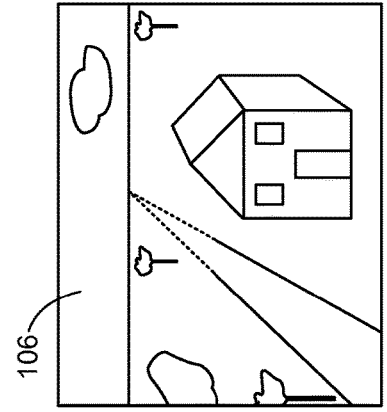
FIG. 9 is an example of the right image.

Referring now to FIG. 9, therein is shown an example of the right image 106. The right image 106 is the portion of the original image 102 of FIG. 1 visible from the second position 124 of FIG. 1.

Figure 10:
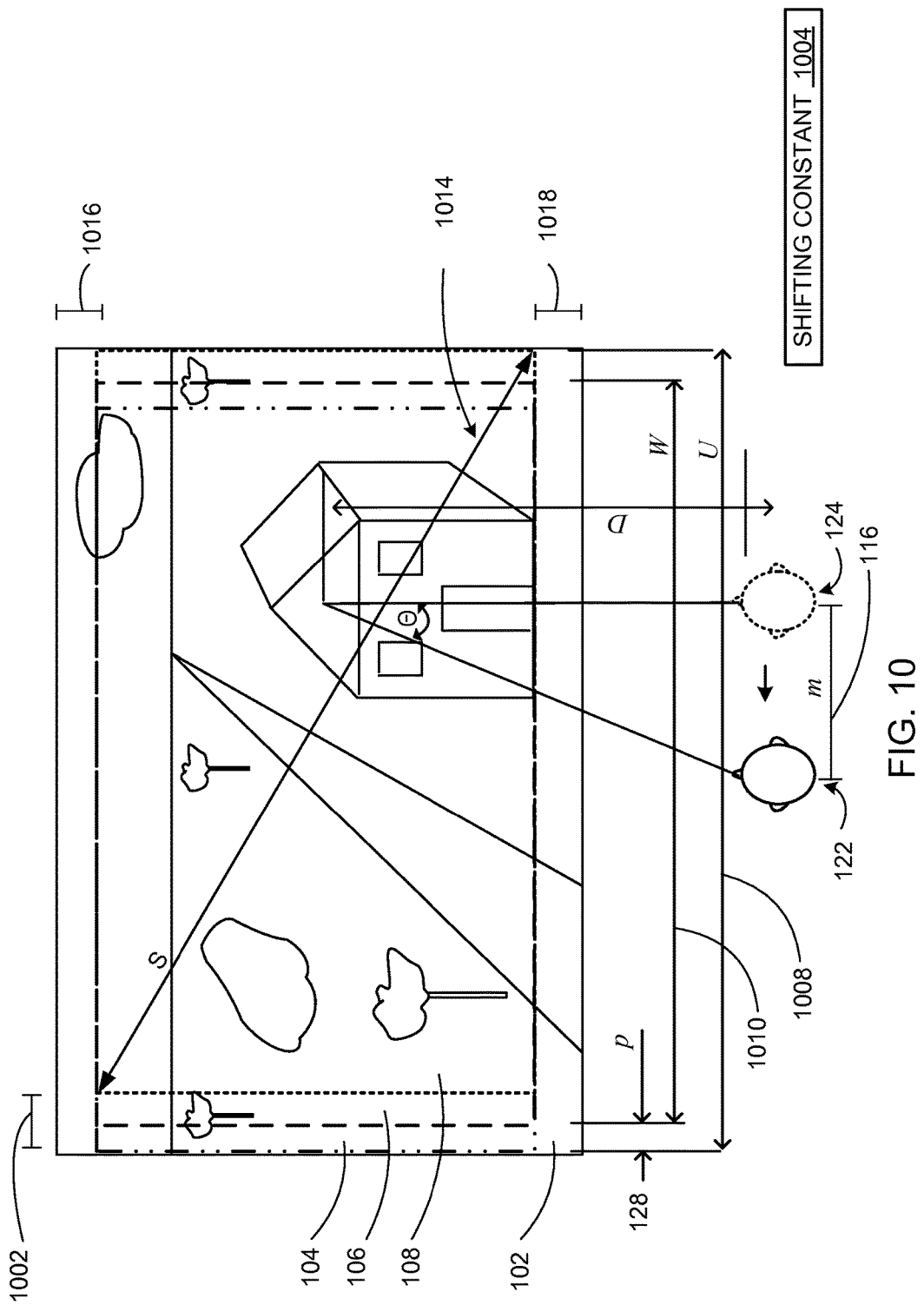
FIG. 10 is an example of calculating the cropping offset.

Referring now to FIG. 10, therein is shown an example of calculating the cropping offset 128. An edge margin 1002 is the horizontal width of the left margin view 402 of FIG. 4 or the right margin view 502 of FIG. 5. The edge margin 1002 is configured based on the amount of the viewer movement 116 between the first position 122 of the viewer 120 of FIG. 1 and the second position 124 of the viewer 120.

The original image 102 includes the left image 104, the center image 108, and the right image 106, which are subsets of the original image 102. The center image 108 can be initially displayed on the original image 102.

The cropped image 114 of FIG. 1 can be displayed on the display screen 132 of FIG. 1. The display screen 132 can have a diagonal size 1014. The diagonal size 1014 is the distance from the upper left corner to the lower right corner of the display screen 132. Because the cropped image 114 is fully displayed on the display screen 132, the diagonal size 1014 is also the distance from the upper left corner to the lower right corner of the cropped image 114.

The original image 102 can include an original image width 1008. The original image width 1008 is the width of the original image 102 at an equivalent pixel resolution as the display screen 132. This is the apparent width of the original image 102 as it would be displayed extending off the edge of the display screen 132 of display unit 118 of FIG. 1.

The display screen 132 can include the display unit width 1010. The display unit width 1010 is the width of the display screen 132. The display unit width 1010 can be measured in pixels, inches, centimeters, or a combination thereof.

When the cropped image 114 is displayed on the display screen 132, the vertical height of the cropped image 114 is less than the vertical height of the display screen 132 if the original aspect ratio of the original image 102 is maintained. The display screen 132 can include a top offset 1016 and a bottom offset 1018. The top offset 1016 is the unused space between the cropped image 114 and the top of the display screen 132. The bottom offset 1018 is the unused space between the cropped image 114 and the bottom of the display screen 132.

The left image 104 can be calculated by horizontally shifting the original image 102 by the width of the edge margin 1002. The right image 106 can be calculated by horizontally shifting the original image 102 by the width of the edge margin 1002.

The edge margin 1002, represented by p below, can be calculated as shown in Equation 1 below. In addition, the Equation 1 can include C, a shifting constant 1004. The shifting constant 1004 is an experimentally determined value for adjusting the amount of image shifting. The shifting constant 1004 can be varied for optimized viewing. For example, the shifting constant 1004 can have a value of 54. Equation 1 is as follows:

$$p = \begin{cases} U * \frac{m}{D} * \frac{C}{S} \\ 0.1 * U, \text{ if } \frac{m}{D} * \frac{C}{S} > 0.1 \\ 0.1 * U, \text{ if } \frac{m}{D} * \frac{C}{S} < -0.1 \end{cases} \quad (1)$$

where:

p is the width of the cropping offset 128.

U is the width of the original image 102.

W is the width of the display unit 118.

m is the viewer movement relative to the middle point of the original image 102 measured horizontally and parallel to the display of the original image 102.

D is the distance from the display unit 118 to the viewer 120.

S is the diagonal size 1014 of the display unit 118.

C is the experimentally determined value for the shifting constant 1004.

The ratio of the width of the original image 102 to the width of the cropped image 114 is 0.8 as shown in Equation (2). This limits the size of the left margin view 402 of FIG. 4 and the right margin view 502 of FIG. 5 to synthesize the 3D effect of cropping the original image 102. The value of 0.8 or 80% is an experimentally determined value to optimize the quality of the view.

$$\frac{W}{U} = 0.8 \quad (2)$$

where:

U is the width of the original image 102

W is the width of the display unit 118

The amount of movement of the user can be express as an angular measurement value of theta, θ. Theta can be replaced in Equation 1 above using a substitution of tangent (θ)=m/D.

It has been discovered that limiting the ratio of the width of the original image to the width of the cropped image 114 to a value of 0.8 improves the 3D performance of the image processing system 100 of FIG. 1 by limiting the amount of cropping performed to simulate the 3D image in the cropped image 114. By keeping the ratio within a small range of 0.8, 3D artifacts are reduced and the overall 3D effect is improved.

Figure 11:
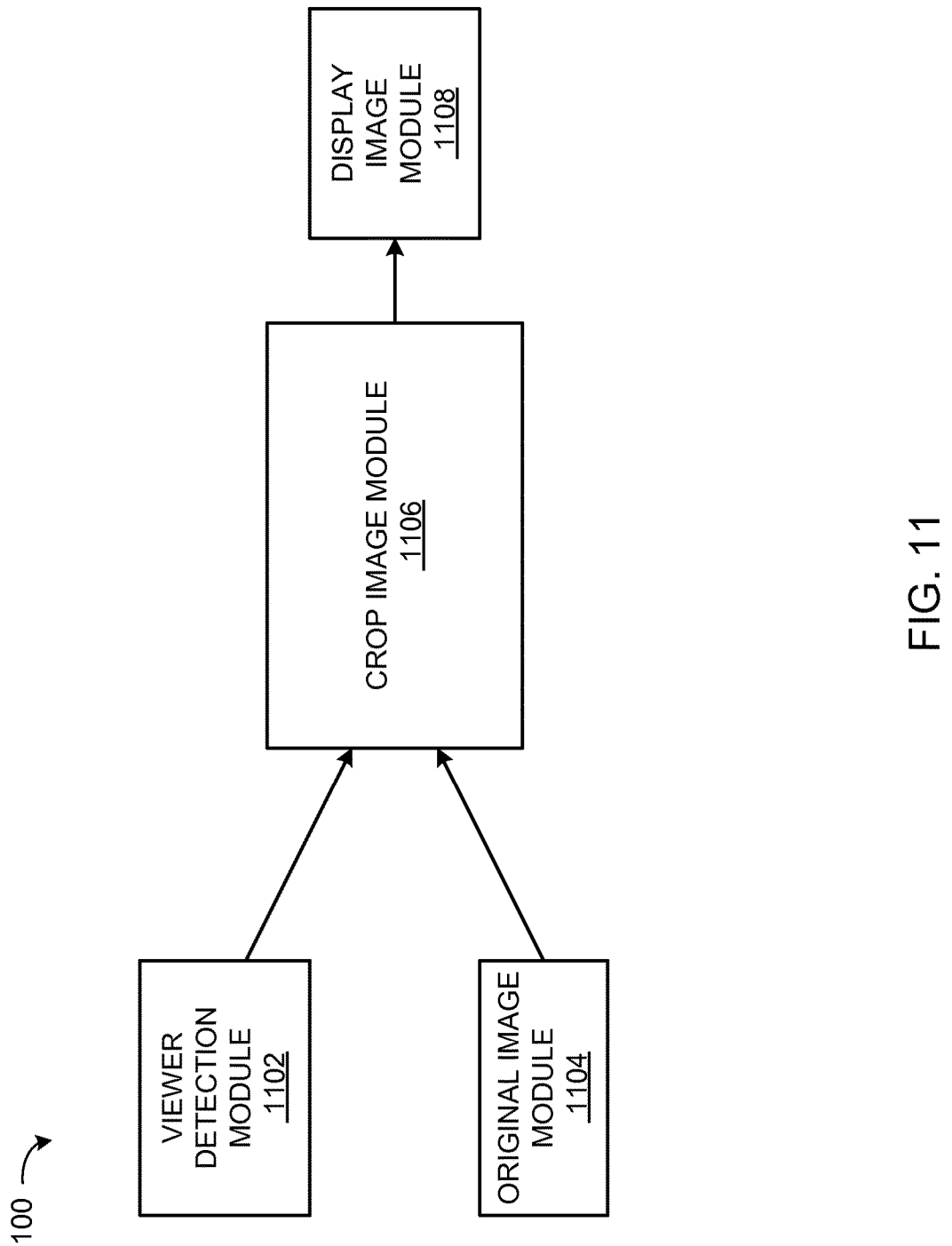
FIG. 11 is an exemplary process diagram of the image processing system.

Referring now to FIG. 11, therein is shown an exemplary process diagram of the image processing system 100. A crop image module 1106 can receive the original image 102 of FIG. 1 from a get original image module 1104. The crop image module 1106 can receive the current position 126 of FIG. 1 of the viewer 120 of FIG. 1 from a viewer detection module 1102.

The crop image module 1106 can calculate the cropped image 114 of FIG. 1 based on the current position 126 and the original image 102. The crop image module 1106 send the cropped image 114 to the display image module 1108 for display.

The crop image module 1106 can receive the original image 102 from the get original image module 1104. The crop image module 1106 can receive the current position 126 of the viewer 120 from the viewer detection module 1102.

Figure 12:
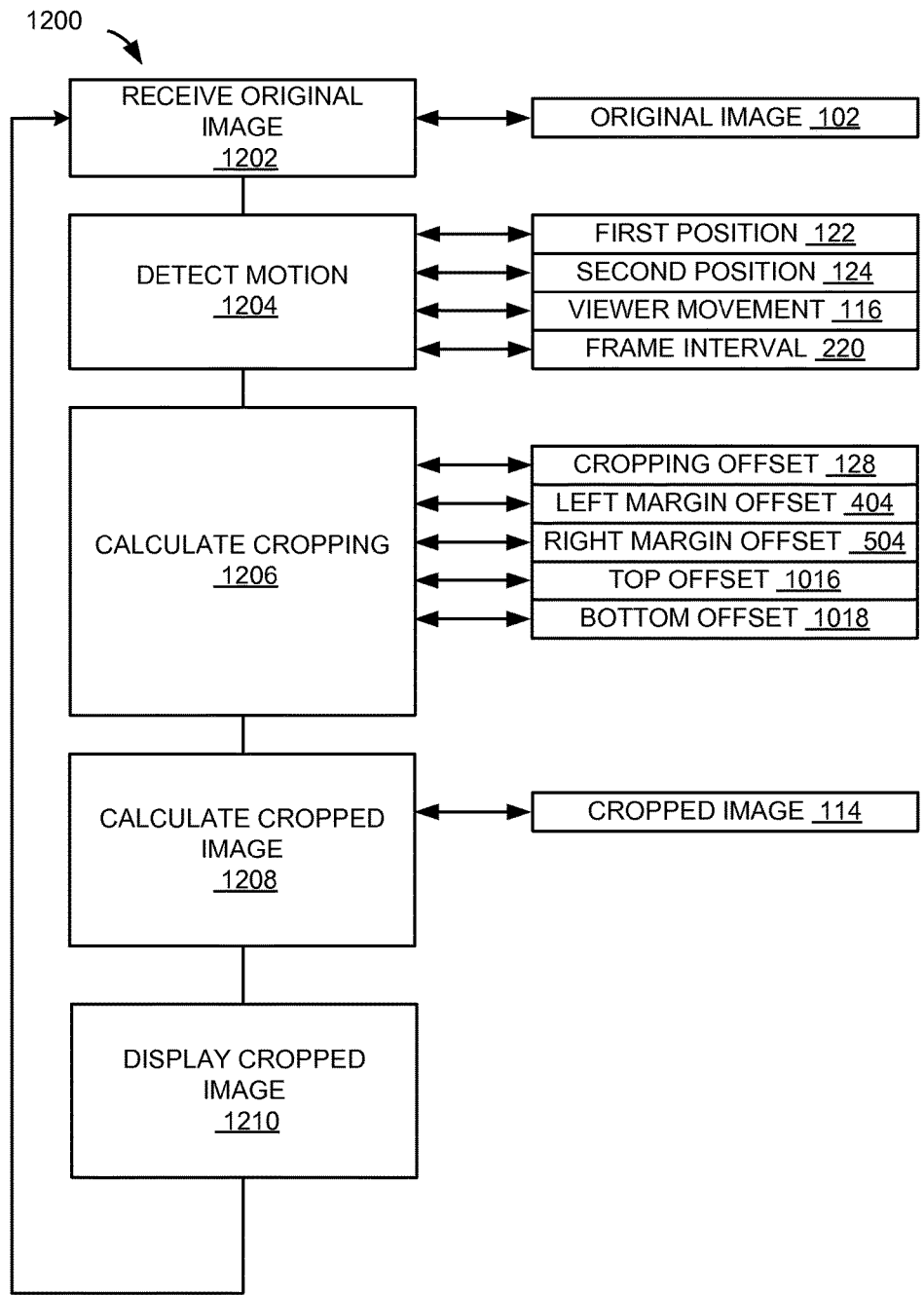
FIG. 12 is an exemplary process flow of the image processing system.

Referring now to FIG. 12, therein is shown an exemplary process flow 1200 of the image processing system 100 of FIG. 1. The image processing system 100 can include a receive original image module 1202, a detect motion module 1204, a calculate cropping module 1206, a calculate cropped image module 1208, and a display cropped image module 1210.

The receive original image module 1202 can acquire the original image 102. The original image can be acquired in a variety of ways. For example, the original image 102 can be received as a frame in the video stream 201, such as a high definition (HD) video data from a Digital Versatile Disc™ (DVD), broadcast television, cable television, or a combination thereof.

After the original image 102 has been received, the receive original image module 1202 can send the original image 102 to the calculate cropping module 1206 and pass the control flow to the detect motion module 1204.

The detect motion module 1204 can operate the position detector 110 to determine the position of the viewer 120 in front of the display unit 118 of FIG. 1. The detect motion module 1204 can capture the first position 122 and the second position 124 of the viewer 120 to calculate the viewer movement 116. The viewer movement 116 is the distance the viewer 120 has moved during the capture of the first position 122 and the second position 124 within the frame interval 220.

In an illustrative example, the detect motion module 1204 can capture the first position 122 and the second position 124 of the viewer 120 between the frames of the video stream 201, allowing the cropped image 114 to be calculated before each frame is displayed. This provides a dynamic 3D immersive effect during the playback of the video stream 201.

The detect motion module 1204 can provide the first position 122, the second position 124, and the viewer movement 116 to the calculate cropping module 1206. After detecting the position of the viewer 120, the control flow can pass to the calculate cropping module 1206.

The calculate cropping module 1206 can calculate the cropping offset 128 for the original image 102. The cropping offset 128 can be calculated as shown in Equation 1. The cropping offset 128 can include the left margin offset 404, the right margin offset 504, the top offset 1016, and the bottom offset 1018. The cropping offset 128 can include the left margin offset 404 if the viewer movement 116 is to the left. The cropping offset 128 can include the right margin offset 504 if the viewer movement 116 is to the right. In an alternative configuration, the cropping offset 128 can be calculated by defining a cropping box, such as a rectangular area defined by an initial offset point, such as the upper left corner or the lower left corner, and the dimensions of a rectangle.

The calculate cropping module 1206 can pass the cropping offset 128 to the calculate cropped image module 1208. On completion, the control flow can pass to the calculate cropped image module 1208.

The calculate cropped image module 1208 can calculate the cropped image 114 by cropping the original image 102 by the cropping offset 128. For example, if the cropping offset 128 has a value of 99 pixels and the viewer movement 116 is to the left, then the original image 102 can be cropped by 99 pixels on the right hand side of the original image 102. In another example, if the cropping offset 128 has a value of 50 pixels and the viewer movement 116 is to the right, then the original image 102 can be cropped by 50 pixels on the left hand side of the original image 102.

In another example, the cropped image 114 can be cropped vertically as well as horizontally. The cropped image 114 can be cropped off the top side and the bottom side. The vertical cropping can be used to maintain the aspect ratio of the original image 102.

The calculate cropped image module 1208 can pass the cropped image 114 to the display image module 1108 of FIG. 11. After completion, the control flow can pass to the display cropped image module 1210.

The display cropped image module can display the cropped image 114 on the display unit 118. After displaying the cropped image 114, the control flow can pass back to the receive original image module 1202.

It has been discovered that simulating the immersive three-dimensional effect by displaying the cropped image 114 can allow for higher frame rates and larger sizes of the original image 102.

Figure 13:
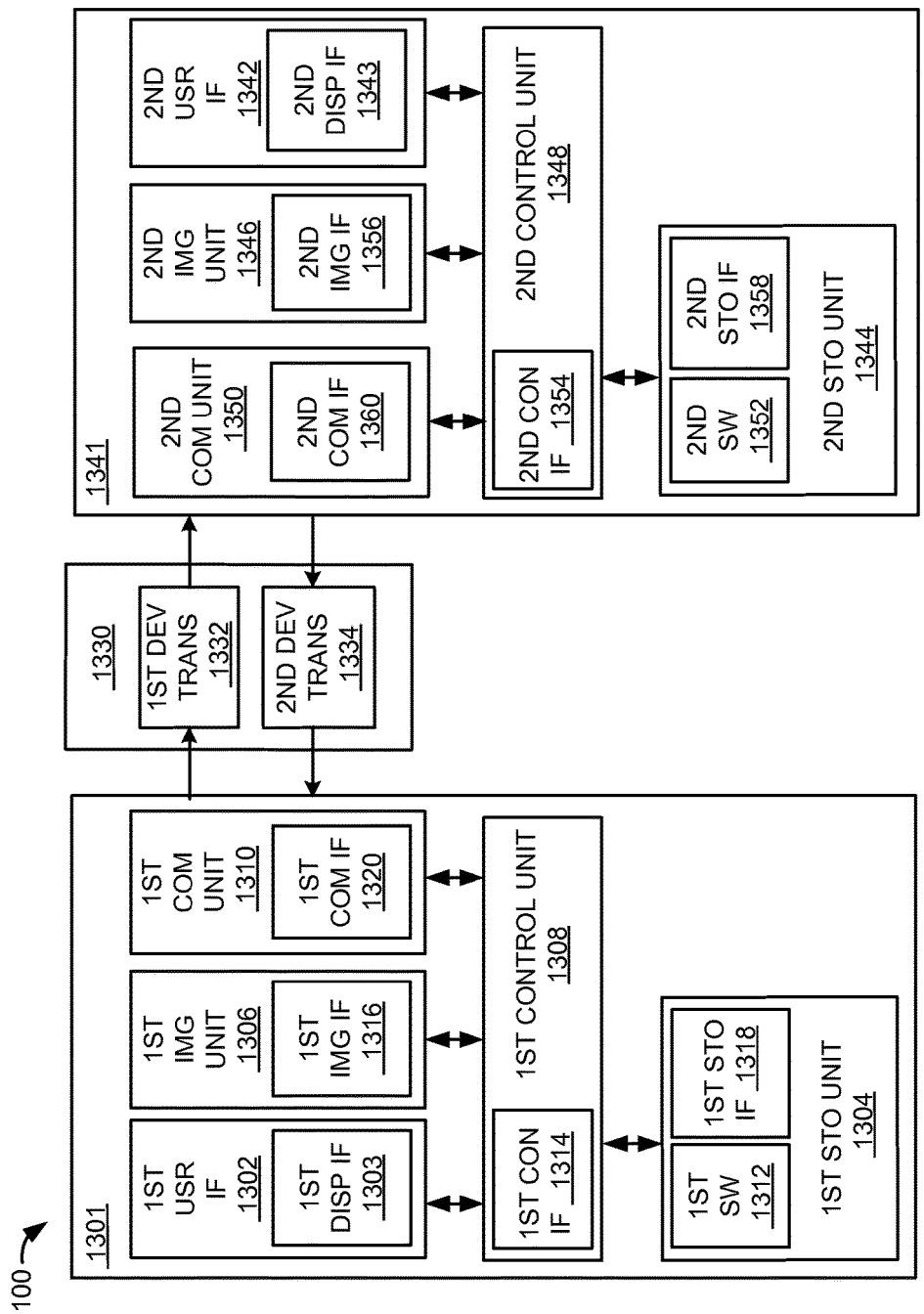
FIG. 13 is an example of a functional block diagram of the image processing system.

Referring now to FIG. 13, therein is shown an example of a functional block diagram of the image processing system 100. The image processing system 100 can include a first device 1301, a second device 1341 and a communication path 1330.

The image processing system 100 can be implemented using the first device 1301 and the second device 1341. For example, the first device 1301, the second device 1341, and the communication path 1330 can be used to implement the image processor 112 of FIG. 1 and the display unit 118 of FIG. 1. However, it is understood that the image processing system 100 can be implemented in a variety of ways and the functionality of the image processor 112 and the display unit 118 can be partitioned differently over the first device 1301, the second device 1341, and the communication path 1330.

The first device 1301 can communicate with the second device 1341 over the communication path 1330. The first device 1301 can send information in a first device transmission 1332 over the communication path 1330 to the second device 1341. The second device 1341 can send information in a second device transmission 1334 over the communication path 1330 to the first device 1301.

For illustrative purposes, the image processing system 100 is shown with the first device 1301 as a client device, although it is understood that the image processing system 100 can have the first device 1301 as a different type of device. For example, the first device can be a server.

Also for illustrative purposes, the image processing system 100 is shown with the second device 1341 as a server, although it is understood that the image processing system 100 can have the second device 1341 as a different type of device. For example, the second device 1341 can be a client device.

For brevity of description in this embodiment of the present invention, the first device 1301 will be described as a client device, such as a video camera, smart phone, or a combination thereof. The present invention is not limited to this selection for the type of devices. The selection is an example of the present invention.

The first device 1301 can include a first control unit 1308. The first control unit 1308 can include a first control interface 1314. The first control unit 1308 can execute a first software 1312 to provide the intelligence of the image processing system 100.

The first control unit 1308 can be implemented in a number of different manners. For example, the first control unit 1308 can be a processor, an embedded processor, a microprocessor, a hardware control logic, a hardware finite state machine (FSM), a digital signal processor (DSP), or a combination thereof.

The first control interface 1314 can be used for communication between the first control unit 1308 and other functional units in the first device 1301. The first control interface 1314 can also be used for communication that is external to the first device 1301.

The first control interface 1314 can receive information from the other functional units or from external sources, or can transmit information to the other functional units or to external destinations. The external sources and the external destinations refer to sources and destinations external to the first device 1301.

The first control interface 1314 can be implemented in different ways and can include different implementations depending on which functional units or external units are being interfaced with the first control interface 1314. For example, the first control interface 1314 can be implemented with electrical circuitry, microelectromechanical systems (MEMS), optical circuitry, wireless circuitry, wireline circuitry, or a combination thereof.

The first device 1301 can include a first storage unit 1304. The first storage unit 1304 can store the first software 1312. The first storage unit 1304 can also store the relevant information, such as images, syntax information, videos, profiles, display preferences, sensor data, or any combination thereof.

The first storage unit 1304 can be a volatile memory, a nonvolatile memory, an internal memory, an external memory, or a combination thereof. For example, the first storage unit 1304 can be a nonvolatile storage such as non-volatile random access memory (NVRAM), Flash memory, disk storage, or a volatile storage such as static random access memory (SRAM).

The first storage unit 1304 can include a first storage interface 1318. The first storage interface 1318 can be used for communication between the first storage unit 1304 and other functional units in the first device 1301. The first storage interface 1318 can also be used for communication that is external to the first device 1301.

The first device 1301 can include a first imaging unit 1306. The first imaging unit 1306 can capture the first image 210 of FIG. 2 and the second image 212 of FIG. 2. The first imaging unit 1306 can include a digital camera, a video camera, an optical sensor, or any combination thereof.

The first imaging unit 1306 can include a first imaging interface 1316. The first imaging interface 1316 can be used for communication between the first imaging unit 1306 and other functional units in the first device 1301.

The first imaging interface 1316 can receive information from the other functional units or from external sources, or can transmit information to the other functional units or to external destinations. The external sources and the external destinations refer to sources and destinations external to the first device 1301.

The first imaging interface 1316 can include different implementations depending on which functional units or external units are being interfaced with the first imaging unit 1306. The first imaging interface 1316 can be implemented with technologies and techniques similar to the implementation of the first control interface 1314.

The first storage interface 1318 can receive information from the other functional units or from external sources, or can transmit information to the other functional units or to external destinations. The external sources and the external destinations refer to sources and destinations external to the first device 1301.

The first storage interface 1318 can include different implementations depending on which functional units or external units are being interfaced with the first storage unit 1304. The first storage interface 1318 can be implemented with technologies and techniques similar to the implementation of the first control interface 1314.

The first device 1301 can include a first communication unit 1310. The first communication unit 1310 can be for enabling external communication to and from the first device 1301. For example, the first communication unit 1310 can permit the first device 1301 to communicate with the second device 1341, an attachment, such as a peripheral device or a computer desktop, and the communication path 1330.

The first communication unit 1310 can also function as a communication hub allowing the first device 1301 to function as part of the communication path 1330 and not limited to be an end point or terminal unit to the communication path 1330. The first communication unit 1310 can include active and passive components, such as microelectronics or an antenna, for interaction with the communication path 1330.

The first communication unit 1310 can include a first communication interface 1320. The first communication interface 1320 can be used for communication between the first communication unit 1310 and other functional units in the first device 1301. The first communication interface 1320 can receive information from the other functional units or can transmit information to the other functional units.

The first communication interface 1320 can include different implementations depending on which functional units are being interfaced with the first communication unit 1310. The first communication interface 1320 can be implemented with technologies and techniques similar to the implementation of the first control interface 1314.

The first device 1301 can include a first user interface 1302. The first user interface 1302 allows a user (not shown) to interface and interact with the first device 1301. The first user interface 1302 can include a first user input (not shown). The first user input can include touch screen, gestures, motion detection, buttons, slicers, knobs, virtual buttons, voice recognition controls, or any combination thereof.

The first user interface 1302 can include the first display interface 1303. The first display interface 1303 can allow the user to interact with the first user interface 1302. The first display interface 1303 can include a display, a video screen, a speaker, or any combination thereof.

The first control unit 1308 can operate with the first user interface 1302 to display video information generated by the image processing system 100 on the first display interface 1303. The first control unit 1308 can also execute the first software 1312 for the other functions of the image processing system 100, including receiving image information from the first storage unit 1304 for display on the first display interface 1303. The first control unit 1308 can further execute the first software 1312 for interaction with the communication path 1330 via the first communication unit 1310.

For illustrative purposes, the first device 1301 can be partitioned having the first user interface 1302, the first storage unit 1304, the first control unit 1308, and the first communication unit 1310, although it is understood that the first device 1301 can have a different partition. For example, the first software 1312 can be partitioned differently such that some or all of its function can be in the first control unit 1308 and the first communication unit 1310. Also, the first device 1301 can include other functional units not shown for clarity.

The image processing system 100 can include the second device 1341. The second device 1341 can be optimized for implementing the present invention in a multiple device embodiment with the first device 1301. The second device 1341 can provide the additional or higher performance processing power compared to the first device 1301.

The second device 1341 can include a second control unit 1348. The second control unit 1348 can include a second control interface 1354. The second control unit 1348 can execute a second software 1352 to provide the intelligence of the image processing system 100.

The second control unit 1348 can be implemented in a number of different manners. For example, the second control unit 1348 can be a processor, an embedded processor, a microprocessor, a hardware control logic, a hardware finite state machine (FSM), a digital signal processor (DSP), or a combination thereof.

The second control interface 1354 can be used for communication between the second control unit 1348 and other functional units in the second device 1341. The second control interface 1354 can also be used for communication that is external to the second device 1341.

The second control interface 1354 can receive information from the other functional units or from external sources, or can transmit information to the other functional units or to external destinations. The external sources and the external destinations refer to sources and destinations external to the second device 1341.

The second control interface 1354 can be implemented in different ways and can include different implementations depending on which functional units or external units are being interfaced with the second control interface 1354. For example, the second control interface 1354 can be implemented with electrical circuitry, microelectromechanical systems (MEMS), optical circuitry, wireless circuitry, wireline circuitry, or a combination thereof.

The second device 1341 can include a second storage unit 1344. The second storage unit 1344 can store the second software 1352. The second storage unit 1344 can also store the relevant information, such as images, syntax information, video, profiles, display preferences, sensor data, or any combination thereof.

The second storage unit 1344 can be a volatile memory, a nonvolatile memory, an internal memory, an external memory, or a combination thereof. For example, the second storage unit 1344 can be a nonvolatile storage such as non-volatile random access memory (NVRAM), Flash memory, disk storage, or a volatile storage such as static random access memory (SRAM).

The second storage unit 1344 can include a second storage interface 1358. The second storage interface 1358 can be used for communication between the second storage unit 1344 and other functional units in the second device 1341. The second storage interface 1358 can also be used for communication that is external to the second device 1341.

The second storage interface 1358 can receive information from the other functional units or from external sources, or can transmit information to the other functional units or to external destinations. The external sources and the external destinations refer to sources and destinations external to the second device 1341.

The second storage interface 1358 can include different implementations depending on which functional units or external units are being interfaced with the second storage unit 1344. The second storage interface 1358 can be implemented with technologies and techniques similar to the implementation of the second control interface 1354.

The second device 1341 can include a second imaging unit 1346. The second imaging unit 1346 can capture the first image 210 from the real world. The first imaging unit 1306 can include a digital camera, a video camera, an optical sensor, or any combination thereof.

The second imaging unit 1346 can include a second imaging interface 1356. The second imaging interface 1356 can be used for communication between the second imaging unit 1346 and other functional units in the second device 1341.

The second imaging interface 1356 can receive information from the other functional units or from external sources, or can transmit information to the other functional units or to external destinations. The external sources and the external destinations refer to sources and destinations external to the second device 1341.

The second imaging interface 1356 can include different implementations depending on which functional units or external units are being interfaced with the second imaging unit 1346. The second imaging interface 1356 can be implemented with technologies and techniques similar to the implementation of the first control interface 1314.

The second device 1341 can include a second communication unit 1350. The second communication unit 1350 can enable external communication to and from the second device 1341. For example, the second communication unit 1350 can permit the second device 1341 to communicate with the first device 1301, an attachment, such as a peripheral device or a computer desktop, and the communication path 1330.

The second communication unit 1350 can also function as a communication hub allowing the second device 1341 to function as part of the communication path 1330 and not limited to be an end point or terminal unit to the communication path 1330. The second communication unit 1350 can include active and passive components, such as microelectronics or an antenna, for interaction with the communication path 1330.

The second communication unit 1350 can include a second communication interface 1360. The second communication interface 1360 can be used for communication between the second communication unit 1350 and other functional units in the second device 1341. The second communication interface 1360 can receive information from the other functional units or can transmit information to the other functional units.

The second communication interface 1360 can include different implementations depending on which functional units are being interfaced with the second communication unit 1350. The second communication interface 1360 can be implemented with technologies and techniques similar to the implementation of the second control interface 1354.

The second device 1341 can include a second user interface 1342. The second user interface 1342 allows a user (not shown) to interface and interact with the second device 1341. The second user interface 1342 can include a second user input (not shown). The second user input can include touch screen, gestures, motion detection, buttons, slicers, knobs, virtual buttons, voice recognition controls, or any combination thereof.

The second user interface 1342 can include a second display interface 1343. The second display interface 1343 can allow the user to interact with the second user interface 1342. The second display interface 1343 can include a display, a video screen, a speaker, or any combination thereof.

The second control unit 1348 can operate with the second user interface 1342 to display information generated by the image processing system 100 on the second display interface 1343. The second control unit 1348 can also execute the second software 1352 for the other functions of the image processing system 100, including receiving display information from the second storage unit 1344 for display on the second display interface 1343. The second control unit 1348 can further execute the second software 1352 for interaction with the communication path 1330 via the second communication unit 1350.

For illustrative purposes, the second device 1341 can be partitioned having the second user interface 1342, the second storage unit 1344, the second control unit 1348, and the second communication unit 1350, although it is understood that the second device 1341 can have a different partition. For example, the second software 1352 can be partitioned differently such that some or all of its function can be in the second control unit 1348 and the second communication unit 1350. Also, the second device 1341 can include other functional units not shown in FIG. 17 for clarity.

The first communication unit 1310 can couple with the communication path 1330 to send information to the second device 1341 in the first device transmission 1332. The second device 1341 can receive information in the second communication unit 1350 from the first device transmission 1332 of the communication path 1330.

The second communication unit 1350 can couple with the communication path 1330 to send image information to the first device 1301 in the second device transmission 1334. The first device 1301 can receive image information in the first communication unit 1310 from the second device transmission 1334 of the communication path 1330. The image processing system 100 can be executed by the first control unit 1308, the second control unit 1348, or a combination thereof.

The functional units in the first device 1301 can work individually and independently of the other functional units. For illustrative purposes, the image processing system 100 is described by operation of the first device 1301. It is understood that the first device 1301 can operate any of the modules and functions of the image processing system 100. For example, the first device 1301 can be described to operate the first control unit 1308.

The functional units in the second device 1341 can work individually and independently of the other functional units. For illustrative purposes, the image processing system 100 can be described by operation of the second device 1341. It is understood that the second device 1341 can operate any of the modules and functions of the image processing system 100. For example, the second device 1341 is described to operate the second control unit 1348.

For illustrative purposes, the image processing system 100 is described by operation of the first device 1301 and the second device 1341. It is understood that the first device 1301 and the second device 1341 can operate any of the modules and functions of the image processing system 100. For example, the first device 1301 is described to operate the first control unit 1308, although it is understood that the second device 1341 can also operate the first control unit 1308.

The physical transformation from the motion of the viewer 120 to the display of the cropped image 114 results in physical changes to the pixel elements of the display device in the physical world, such as the change of electrical state the pixel element, is based on the operation of the image processing system 100. As the changes in the physical world occurs, such as the motion of the viewer 120 in the scene 302, the movement itself creates additional information, such as the updates to the cropped image 114, that are converted back into changes in the pixel elements of the display device for continued operation of the image processing system 100.

The first software 1312 of the first device 1301 can implement portions of the image processing system 100. For example, the first software 1312 can include the receive original image module 1202 and the detect motion module 1204.

The first control unit 1308 can execute the first software 1312 for the receive original image module 1202 to acquire the original image 102. The first control unit 1308 can execute the first software 1312 for the detect motion module 1204 to acquire the first position 122 and the second position 124.

The second software 1352 of the second device 1341 can implement portions of the image processing system 100. For example, the second software 1352 can include the calculate cropping module 1206, the calculate cropped image module 1208, and the display image module 1108.

The second control unit 1348 can execute the second software 1352 for the calculate cropping module 1206 to calculate the cropping offset 128. The second control unit 1348 can execute the second software 1352 for the calculate cropped image module 1208 to generate the cropped image 114. The second control unit 1348 can execute the second software 1352 for the display cropped image module 1210 to display the cropped image 114 on the display unit 118.

The image processing system 100 describes the module functions or order as an example. Each of the modules can operate individually and independently of the other modules. The modules can be partitioned differently. For example, the calculate cropping 1206 and the calculate cropped image module 1208 can be combined.

Furthermore, data generated in one module can be used by another module without being directly coupled to each other. For example, the calculate cropping module 1206 can receive the first position 122 and the second position 124 from the detect motion module 1204.

The modules can be implemented in a variety of ways. The receive original image module 1202 and the detect motion module 1204 can be implemented in hardware accelerators (not shown) within the first control unit 1308 or the second control unit 1348, or can be implemented in hardware accelerators (not shown) in the first device 1301 or the second device 1341 outside of the first control unit 1308 or the second control unit 1348.

Figure 14:
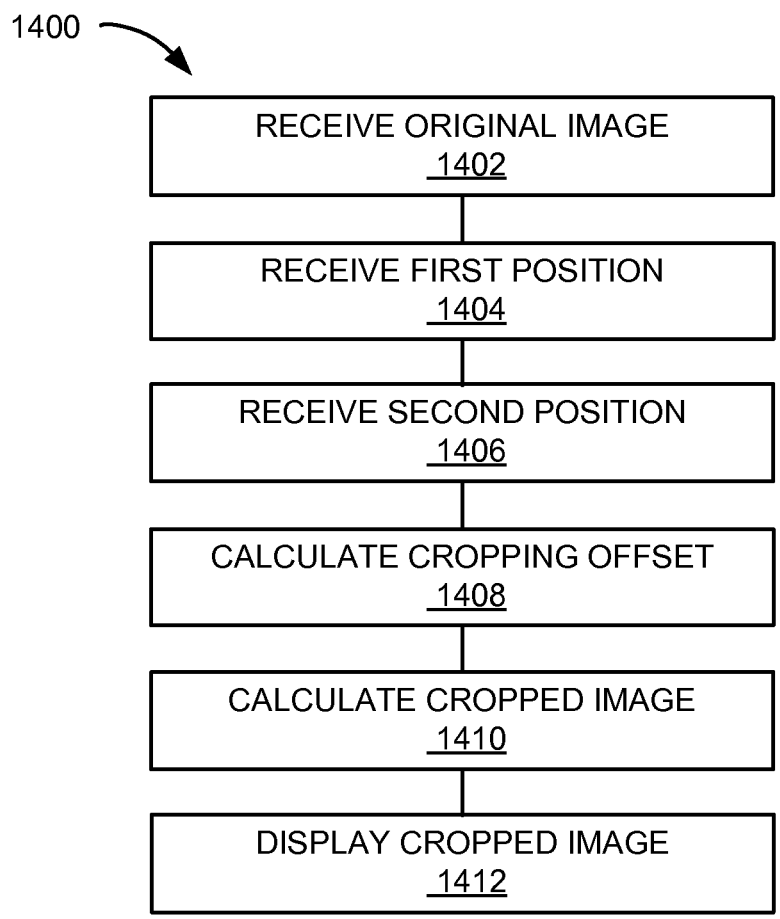
FIG. 14 is a flow chart of a method of operation of the image processing system in a further embodiment of the present invention.

Referring now to FIG. 14, therein is shown a flow chart of a method 1400 of operation of the imaging processing system in a further embodiment of the present invention. The method 1400 includes: receiving an original image in a block 1402; receiving a first position from a position detector in a block 1404; receiving a second position from the position detector in a block 1406; calculating a cropping offset for the original image based on the first position and the second position in a block 1408; calculating a cropped image by cropping the original image by the cropping offset in a block 1410; and displaying the cropped image on a display unit in a block 1412.

It has been discovered that the present invention thus has numerous aspects. The present invention valuably supports and services the historical trend of reducing costs, simplifying systems, and increasing performance. These and other valuable aspects of the present invention consequently further the state of the technology to at least the next level.

Thus, it has been discovered that the image processing system of the present invention furnishes important and heretofore unknown and unavailable solutions, capabilities, and functional aspects for processing image content. The resulting processes and configurations are straightforward, cost-effective, uncomplicated, highly versatile and effective, can be surprisingly and unobviously implemented by adapting known technologies, and are thus readily suited for efficiently and economically manufacturing display devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an image processing system comprising:

receiving an original image;

receiving a first position of a viewer from a position detector;

receiving a second position of the viewer from the position detector;

calculating a cropping offset for the original image based on the first position and the second position;

calculating a cropped image by cropping the original image by the cropping offset; and displaying the cropped image on a display unit, wherein the cropping offset is based on an original image width, a display unit width, a viewer movement, a viewer distance from the position detector, a diagonal size of the display unit and a shifting constant, wherein calculating the cropping offset includes calculating the cropping offset p as:

$$p = \begin{cases} U * \dfrac{m}{D} * \dfrac{C}{S} \\ 0.1 * U, \text{ if } \dfrac{m}{D} * \dfrac{C}{S} > 0.1 \\ 0.1 * U, \text{ if } \dfrac{m}{D} * \dfrac{C}{S} < -0.1 \end{cases},$$

where U is the original image width,
W is the display unit width,
m is the viewer movement,
D is the viewer distance,
S is the diagonal size, and
C is the shifting constant.

2. The method as claimed in claim 1, wherein calculating the cropped image includes cropping the original image on the left side.

3. The method as claimed in claim 1, wherein calculating the cropped image includes cropping the original image on the right side.

4. The method as claimed in claim 1, wherein displaying the cropped image includes:
calculating a top offset and a bottom offset based on the cropping offset for maintaining the aspect ratio of the display unit;
calculating the cropped image by cropping the original image by the top offset from the top of the original image; and
calculating the cropped image by cropping the original image by the bottom offset from the bottom of the original image.

5. A method of operation of an image processing system comprising:
receiving an original image;
receiving a first position of a viewer from a position detector; receiving a second position of the viewer from the position detector;
calculating a viewer movement based on the horizontal distance between the first position and the second position;
calculating a cropping offset for the original image based on the viewer movement;
calculating a cropped image by cropping the original image by the cropping offset; and
displaying the cropped image on a display unit, wherein the cropping offset is based on an original image width, a display unit width, a viewer movement, a viewer distance from the position detector, a diagonal size of the display unit and a shifting constant, wherein calculating the cropping offset includes calculating the cropping offset p as:

$$p = \begin{cases} U * \dfrac{m}{D} * \dfrac{C}{S} \\ 0.1 * U, \text{ if } \dfrac{m}{D} * \dfrac{C}{S} > 0.1 \\ 0.1 * U, \text{ if } \dfrac{m}{D} * \dfrac{C}{S} < -0.1 \end{cases}$$

where U is the original image width,
W is the display unit width,
m is the viewer movement,
D is the viewer distance,
S is the diagonal size, and
C is the shifting constant.

6. The method as claimed in claim 5, wherein calculating the cropped image includes cropping the original image on the left side.

7. The method as claimed in claim 5, wherein calculating the cropped image includes cropping the original image on the right side.

8. The method as claimed in claim 5, wherein displaying the cropped image includes:
calculating a top offset and a bottom offset based on the cropping offset for maintaining the aspect ratio of the display unit;
calculating the cropped image by cropping the original image by the top offset from the top of the original image; and
calculating the cropped image by cropping the original image by the bottom offset from the bottom of the original image.

9. An image processing system comprising:
a get original image module for receiving an original image;
a viewer detection module, coupled to the get original image module, for receiving a first position and a second position of a viewer;
a crop image module, coupled to the position detector, for calculating a cropping offset for the original image based on the first position and the second position, and for calculating a cropped image by cropping the original image by the cropping offset; and
a display image module, coupled to the crop image module, for displaying the cropped image on a display unit, wherein the cropping offset is based on an original image width, a display unit width, a viewer movement, a viewer distance from the position detector, a diagonal size of the display unit and a shifting constant, wherein calculating the cropping offset includes calculating the cropping offset p as:

$$p = \begin{cases} U * \dfrac{m}{D} * \dfrac{C}{S} \\ 0.1 * U, \text{ if } \dfrac{m}{D} * \dfrac{C}{S} > 0.1 \\ 0.1 * U, \text{ if } \dfrac{m}{D} * \dfrac{C}{S} < -0.1 \end{cases}$$

where U is the original image width,
W is the display unit width,
m is the viewer movement,
D is the viewer distance,
S is the diagonal size, and
C is the shifting constant.

10. The system as claimed in claim 9, wherein the crop image module is for calculating the cropped image by cropping the original image on the left side.

11. The system as claimed in claim 9, wherein the crop image module is for calculating the cropped image by cropping the original image on the right side.

12. The system as claimed in claim 9, wherein the display image module is for displaying the cropped image includes:
calculating a top offset and a bottom offset based on the cropping offset for maintaining the aspect ratio of the display unit;
calculating the cropped image by cropping the original image by the top offset from the top of the original image; and calculating the cropped image by cropping the original image by the bottom offset from the bottom of the original image.

13. The system as claimed in claim 9, wherein the crop image module is for calculating a viewer movement based on the horizontal distance between the first position and the second position and for calculating the cropping offset based on the viewer movement.

14. The system as claimed in claim 13, wherein calculating the cropped image includes cropping the original image on the left side.

15. The system as claimed in claim 13, wherein calculating the cropped image includes cropping the original image on the right side.

16. The system as claimed in claim 13, wherein displaying the cropped image includes:
  calculating a top offset and a bottom offset based on the cropping offset for maintaining the aspect ratio of the display unit;
  calculating the cropped image by cropping the original image by the top offset from the top of the original image; and
  calculating the cropped image by cropping the original image by the bottom offset from the bottom of the original image.

* * * * *